United States Patent [19]

Klein

[11] Patent Number: 4,898,433
[45] Date of Patent: Feb. 6, 1990

[54] BRAKE PRESSURE MODULATOR FOR A BRAKE SKID-CONTROLLED BRAKE SYSTEM FOR AUTOMOTIVE VEHICLES

[75] Inventor: Hans-Christof Klein, Hattersheim, Fed. Rep. of Germany

[73] Assignee: Alfred Teves GmbH, Frankfurt, Fed. Rep. of Germany

[21] Appl. No.: 202,079

[22] Filed: Jun. 3, 1988

[30] Foreign Application Priority Data

Jun. 5, 1987 [DE] Fed. Rep. of Germany ....... 3718974

[51] Int. Cl.$^4$ .............................................. B60T 8/42
[52] U.S. Cl. ..................................... 303/115; 303/114
[58] Field of Search ................. 303/113, 114, 115, 119

[56] References Cited

U.S. PATENT DOCUMENTS

| | | | |
|---|---|---|---|
| 3,741,612 | 6/1973 | Ando | 303/115 |
| 4,715,665 | 12/1987 | Ostwald | 303/115 |
| 4,726,549 | 2/1988 | Dittner et al. | 303/115 |
| 4,765,689 | 8/1988 | Rudiger et al. | 303/115 |
| 4,765,690 | 8/1988 | Rudiger et al. | 303/115 |

FOREIGN PATENT DOCUMENTS

| | | |
|---|---|---|
| 1922112 | 11/1969 | Fed. Rep. of Germany . |
| 2617726 | 11/1976 | Fed. Rep. of Germany . |
| 3530280 | 2/1987 | Fed. Rep. of Germany . |
| 3603074 | 3/1987 | Fed. Rep. of Germany . |
| 1425674 | 2/1976 | United Kingdom . |

Primary Examiner—Robert J. Oberleitner
Assistant Examiner—Matthew C. Graham
Attorney, Agent, or Firm—Robert P. Seitter

[57] ABSTRACT

A brake pressure modulator for a brake skid-controlled brake system for automotive vehicles is disclosed including a volume take-up device including a plunger disposed in a cylindrical chamber and preloaded by a spring into the cylindrical chamber. The plunger is closely guided out of the cylindrical chamber to the outside and is connected to a driving mechanism which upon occurrence of a brake skid signal at least in part pulls the plunger out of the cylindrical chamber to expand the volume thereof and to thereby decrease the brake pressure. Provided between the driving mechanism and the plunger is a gear of a transmission ratio variable depending on the plunger position.

10 Claims, 5 Drawing Sheets

BRAKE PRESSURE MODULATOR FOR A BRAKE SKID-CONTROLLED BRAKE SYSTEM FOR AUTOMOTIVE VEHICLES

BACKGROUND OF THE INVENTION

The present invention relates to a brake pressure modulator for use with skid-controlled brake systems of automotive vehicles of the type including at least one volume take-up means provided in the hydraulic conduit leading from a master cylinder to one or more wheel cylinders, with the volume take-up means including a plunger disposed in a cylindrical chamber in communication with the wheel cylinder circuit and preloaded by a force into the cylindrical chamber. The plunger is closely guided outwardly from the cylindrical chamber and is in communication with a vacuum-operated drive mechanism which, upon occurrence of a brake skid signal, partly moves the plunger out of the cylindrical chamber to increase the volume of the cylindrical chamber to thereby correspondingly decrease the brake pressure.

Brake pressure modulators of the afore-described type, upon occurrence of a brake skid signal, counteract the spring which tends to restore the plunger to its resting position with the consequence that, with increasing retraction of the plunger from the cylindrical chamber, the force required to be generated by the driving mechanism must increase, which, if the driving mechanism is made up of a pneumatically operated piston/cylinder arrangement, is unfavorably space-consuming.

Also, it is desirable in such systems to hold the piston in its normal position solely by the force of the driving mechanism and, depending on the amount of brake skid, have the piston retract in a controlled manner. A shortcoming of such system involves the problem that, at the beginning of the retraction movement of the plunger, a very high force corresponding to the high pressure in the wheel brake circuit, will have to be counteracted, whereas, with the plunger more or less moved out, the hydraulic pressure, and thus the force acting upon the plunger, will decrease.

SUMMARY OF THE INVENTION

It is the object of the present invention to provide a brake pressure modulator of the afore-described type, the driving mechanism of which, in all phases of operation, will always apply substantially the same driving force so that the system only need to be sized to develop the driving force to be applied. The physical size of the system can thus be minimized.

To solve this object, it is provided, in the practice of the invention, to locate between the driving mechanism and the plunger a gear of a transmission which is variable with the plunger position and which varies its ratio in response to the plunger position such that the actuating force to be applied by the driving mechanism is substantially constant during the entire retraction process of the plunger.

According to a first advantageous embodiment, the driving mechanism includes a piston/cylinder arrangement in communication with atmospheric pressure and a vacuum source. However, instead of being connected to atmospheric pressure, the driving mechanism can also be in communication with the pressure chamber of a pneumatic brake force booster.

On the one hand, the invention includes volume take-up means operating on a restoring spring and wherein the plunger, through a restoring spring, is preloaded into the cylinder chamber. The gear is also exposed to the increasing restoring force of the spring, as determined by the spring characteristic, as the plunger is increasingly moved out of the cylinder. In that case, provision is made for the gear to transmit forces only in the direction counteracting the force of the restoring spring. In particular such provision includes a coulisse-type path cooperating with a cam.

Preferably, provision is made for in either direction of movement of the plunger, the gear establishes a form-locking connection between the plunger and the driving mechanism, with no driving or adjusting forces, such as the restoring spring force, except for the hydraulic forces in the cylindrical chamber, the forces of the driving mechanism and the unavoidable friction, weight and acceleration forces acting upon the plunger.

Advantageously, the invention assures that, in case of a vacuum failure, the plunger of the volume take-up means remains in its initial position, that is, in a position displaced into the cylindrical chamber. According to the invention, a pneumatic blocking mechanism is connected to atmospheric pressure and to controlled air pressure, respectively, in a vacuum brake force booster and to the vacuum source. The blocking mechanism blocks the plunger in its rest position until adequate vacuum is available to apply to the driving mechanism the pressure required for holding down the plunger.

In the initial condition, the vacuum-operated driving mechanism forces the plunger into the cylindrical chamber and, upon occurrence of brake skid, more or less retracts the plunger from the cylindrical chamber. According to a preferred embodiment of the invention, the blocking mechanism comprises a pneumatic piston for applying pressure to a blocking push rod, and a cylindrical housing enclosing the piston. The piston, through a blocking force, preferably an interlock spring, is preloaded into the blocking position and the cylindrical chamber which, in the direction opposite to the direction of the blocking force, is in neighboring relationship to the piston, is in communication with the same vacuum source as the driving mechanism. The cylindrical chamber provided on the other side of the piston is in communication with atmospheric pressure, and the blocking push rod, with the vacuum turned off, engages a blocking depression matching therewith. The blocking depression is located in a section of the force transmission path between the driving mechanism and the plunger at an angle of preferably about 90° to the force transmission mechanism.

Basically, any conceivable force transmission or reduction means, such as toggle lever, bell-crank, or key lever gears of variable angle of slope, multi-joint gears, gears on parallel and intersecting axes, oblique-plate gears of variable inclination angle, cam plate gears or infinitely variable transmission gears, can be used as gears.

According to one advantageous embodiment of the gear configuration, the gear comprises a cam and one coulisse-type path one-sidedly cooperating therewith, or two coulisse-paths both-sidedly cooperating therewith.

According to another advantageous embodiment of the gear configuration, the gear includes two toggle levers the toggle lever joint of which, optionally, through mechanical intermediate members is connected to the plunger while the free ends thereof are pivotally connected respectively to one pneumatic driving mechanism.

According to another alternative embodiment of a gear configuration the gear comprises a bent lever preferably comprising two lever arms disposed at an angle of, preferably, 90°, with the free ends of the bent lever being pivotally connected to the pivotally suspended driving mechanism or to intermediate members which apply force to the plunger and with the vertex of the bent lever being stationarily hinged.

As the release of the blocking arrangement in case of a vacuum failure would involve serious consequences, such as substantial failure of the brake, the invention insures dual safety for retaining the blocking push rod in the blocking position which, substantially, is attainable in that the blocking push rod engages a blocking depression of the actuating rod preferably in direct or indirect communication with the plunger, namely in a direction vertical to the direction of movement thereof. The blocking push rod, in the direction of movement of the actuating rod, is limitedly movable and is preloaded by an interlock spring in the direction of retraction of the plunger and comprises a locking projection protruding in the direction of movement cooperating with a stationary stop face such that, with the blocking push rod in the blocking position and with the vacuum turned off, the interlock spring forces the blocking push rod into the locking position. The driving mechanism, with the vacuum turned off, displaces the blocking push rod to the other limit of its range of movement into the unlocking position through the actuating rod.

According to an important feature, the locking push rod is disposed in a guiding channel of a control sleeve which extends in a direction vertical to the direction of movement of the actuating rod. The push rod is displaceably disposed in a direction vertical to the direction of movement and the control sleeve, in the interior thereof, accommodates the actuating rod and in piston-type manner, is displaceable in a stationary cylindrical recess. The interlock spring applies force to the control sleeve in the locking direction.

In order to insure that in the event of a vacuum failure, the blocking first occurs through the blocking push rod and only secondly through the actuating rod the various masses and spring forces of the system are so dimensioned that, in case of a vacuum failure, the blocking push rod is displaced through the interlock spring into the blocking position before the actuating rod is displaced from its initial position under the influence of a hydraulic pressure.

The blocking push rod, in the normal condition, i.e., with the vacuum intact, is always held in its blocking stand-by position. Accordingly, provision is made according to the invention for the blocking push rod, in the retracted position thereof, to hold the control sleeve in its unlocking position.

Preferably, the invention can be used with a brake system comprising a vacuum brake force booster and a master cylinder, preferably a tandem master cylinder, to which pressure is applied by the booster. The master cylinder, through the volume take-up means, is in communication with the wheel brake circuits.

In the practice of the invention, the vacuum-operated driving mechanism is in communication with vacuum or the chamber of the brake force booster to which controlled air pressure is applied through the change-over valve. Moreover, provision can be made for the pneumatic actuating means of the blocking mechanism to be connected to vacuum or to the chamber of the brake force booster to which controlled air pressure is applied.

The controlled air pressure difference on the vacuum-operated driving mechanism, hence, is identical with that on the brake force booster, thereby reducing the volumetric rate of flow and the general vacuum requirements and at the same time improving the time pattern of the brake pressure modulator.

BRIEF DESCRIPTION OF THE DRAWING

The invention will now be described with reference to the drawing, wherein.

DETAILED DESCRIPTION OF A PREFERRED EMBODIMENT

Figure 1:
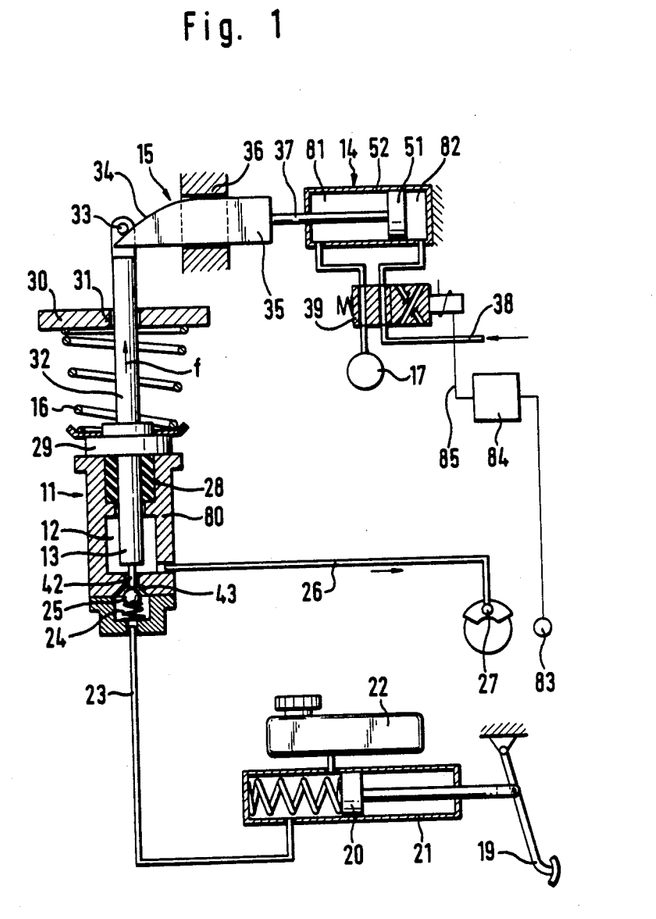
FIG. 1 schematically shows, partly in section, a brake pressure modulator according to the invention operating on a restoring spring on a plunger, and operatively connected to master and wheel cylinders in communication therewith.

Now referring to FIG. 1, a brake pedal 19 applies pressure to a piston 20 of a master cylinder 21 to which the hydraulic fluid from an intake reservoir 22 is supplied. From the pressure chamber of the master cylinder 21, a hydraulic conduit 23 leads to the inlet of a volume take-up 11 comprising a cylindrical chamber 12 which, on the one hand, through a ball valve 25 to which force is applied by a spring 24, is in communication with the hydraulic conduit 23 and, through a laterally branching conduit 26, is in communication with a wheel brake cylinder 27, schematically shown. The conduit 26 also could lead to two or more wheel brake cylinder. Also closing and opening valves to which force is applied by a brake skid control circuit are provided in conduit 26, as described in the following description in reference to FIG. 7.

Disposed in the cylindrical chamber 12 is a plunger 13 of circular-cylindrical shape the end of which facing away from the ball valve 25 is closely guided outwardly through a guiding port 28. Plunger 13, immediately outside the volume take-up 11 is provided with a flange 29, which, in the initial position as shown in the drawing, is in abutment with a housing 80 of the volume take-up 11. A helical compression spring 16 supported with the end thereof facing away from flange 29 on a stationary housing portion 30, exerts pressure from the top on the flange 29.

From flange 29, an actuating rod 32 extends upwardly, as viewed in the drawing, through a port 31 in the housing portion 30 which, by means of a cam 33 provided at the top end thereof, formed as a cotter pin, is superposed on a coulisse-type path 34 of a slide having a convex curvature as shown in the drawing. The slide is displaceably guided in a guide 36 in the horizontal direction, i.e., in a direction vertical to the actuating rod 32.

The side of the slide 35 facing away from the coulisse path 34 is exposed to a pressure application by a driving piston 51 through push rod 37 of a driving mechanism 14. The driving cylinder 52 of the driving mechanism 14, is in communication with an atmospheric pressure connection 38 and a vacuum source 17 through a shuttle valve 39.

The operation of the brake pressure modulator of the afore-described type is as follows:

Normally, the shuttle valve 39 is in a position such that the left-hand cylindrical chamber 81 in FIG. 1 is in communication with atmospheric pressure while the right-hand cylindrical chamber is in communication with vacuum. Slide 35, hence, is held in the normal position as shown in FIG. 1. The restoring spring 16 maintains the plunger 18 in the normal position as shown in FIG. 1 wherein it is pushed to its extreme position into the cylindrical chamber 12 to contact the actuating push rod 42 of the ball valve 25, applying force thereto such that the valve is in an open position as shown in FIG. 1. Hence, by applying the brake pedal 19, through the piston 20, hydraulic pressure can be generated in the wheel brake cylinder 27 to initiate a corresponding decelerating process.

When a wheel sensor arrangement 83 which is responsive to a brake skid supplies a brake skid signal to a brake skid control circuit 84, a reversing signal is supplied from the brake skid control circuit 84, through a control conduit 85, to the shuttle valve 39 such that the latter takes the reversed position as shown in FIG. 1, wherein the vacuum is in communication with the left-hand cylindrical chamber 81 while the atmospheric pressure is in communication with the right-hand cylindrical chamber 82.

Thereupon, the slide 35, in FIG. 1, is displaced to the left while the actuating rod 32, through the effect of the coulisse path 34 and the cam 33 is displaced upwardly in the direction of the arrow. In view of the steeper configuration of the coulisse path 34, at the beginning of movement, a lower force but a greater distance is transmitted to the actuating rod 32. With increasing compression of the restoring spring 16, the coulisse path 34 becomes flatter such that higher forces can be transmitted with smaller distances of travel. In particular, the curve pattern on the coulisse path 34 is designed to take into consideration the decrease of the hydraulic pressure in the cylindrical chamber 12 and the compression of the spring 16 such that, in general, a substantially constant force is made available by the driving means 24 irrespective of the position just taken by the plunger 13.

The restoring spring 16 is dimensioned such that the plunger 13 at all hydraulic pressures occurring in cylindrical chamber 12 is held in its lower normal position unless forces are exerted by the driving means 14.

When extracting the plunger 13 from the cylindrical chamber 12, the ball valve 25 is closed by the effect of the spring 24, thereby precluding a further pressure increase in the wheel cylinder 27. In accordance with the retraction of the plunger 13, the pressure in the wheel brake circuit is decreased according to the predetermined value of the brake skid control circuit 84.

Once the pressure decrease in the wheel brake circuit required for removing the brake skid is attained, the brake skid control circuit 84 restores the shuttle valve 39 to its initial position resulting in the plunger 13 being pushed back to the normal position as shown in FIG. 1.

Generally, the shuttle valve 39, in rapid sequence, is switched back and forth by the brake skid control circuit 84 such that, in general, the decrease in the brake pressure in the wheel brake circuit just required to avoid the brake skid is attained.

In the following description, the reference numerals designate corresponding parts in FIG. 1.

Figure 2:
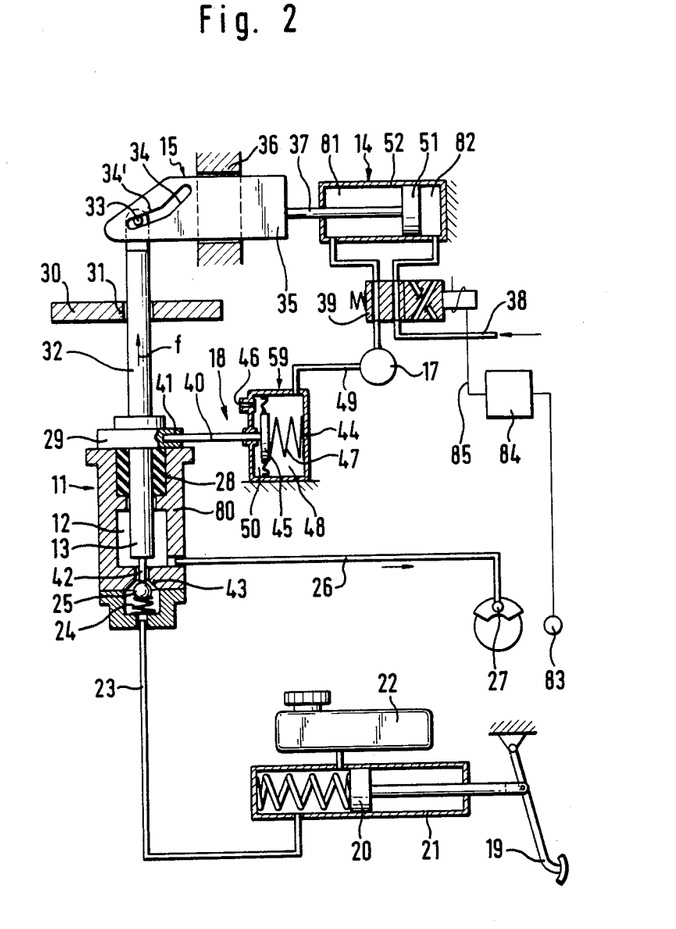
FIG. 2 schematically shows another embodiment of the invention similar to FIG. 1 including a blocking arrangement.

The embodiment according to FIG. 2, on the one hand, is distinguished from the one of FIG. 1 in that the restoring spring 16 is eliminated and the slide 35 comprises two coulisse-type paths 34, 34' surrounding the cam 33 and engaging opposite sides of the cam. The top coulisse path 34' straddles the cam 33 from the top and transfers from the driving mechanism 14 forces acting in the downward direction as viewed in the drawing to the actuating rod 32, thereby replacing the restoring spring 16.

Due to the elimination of the restoring spring 16 and the pressure characteristics in the cylindrical chamber 12, the coulisse-type paths 34, 34', in the embodiment according to FIG. 2, are of a curvature extending in the direction opposite to that shown in FIG. 1. That is, they are of a concave curvature, because, at the beginning of the retraction movement of the plunger 13, high downholding forces are to be applied which decrease with an increasing retraction movement of the plunger 13 out of the cylindrical chamber 12. The curvature of the coulisse-type paths 34 and 34', hence, is selected so as to insure that the actuating force for the plunger 13 to be generated by the driving mechanism 14, in any position of the plunger 13, is substantially the same.

Connected to the vacuum source 17 is a blocking mechanism 18 also including a pneumatic actuator 59 configured as a piston/cylinder arrangement and provided with a blocking push rod 40 to which force is applied by a piston 45 and which engages, in a transverse direction, relative to the plunger 13, a blocking depression 41 of flange 29 so that the plunger 13, in the resting position as shown in the drawing, is blocked against displacement in the direction of the arrow f. The piston 45 is in a cylindrical housing 44 and is desplaceably disposed in the direction of the actuating rod 40 and in a direction perpendicular to plunger 13. Atmospheric pressure is applied to the piston 45, from the side of the blocking plunger 40 through a port 46 provided in the cylindrical housing 44 in the cylindrical chamber 50, while, vacuum and force exerted by a blocking spring 47 are applied from the opposite cylindrical chamber 48, which, through a conduit 49, is in communication with the vacuum source 17 of the driving mechanism 14. The piston 45 is forced into the blocking position if no vacuum prevails in the cylindrical chamber 48 where at the blocking plunger 40 is in blocking engagement with the blocking depression 41.

The operation of the brake pressure modulator according to FIG. 2 is as follows:

In normal decelerations, in the absence of any brake skid, the volume take-up 11 takes the normal position as shown in the drawing wherein the ball valve 25 is opened through the actuating plunger 42 in abutment with plunger 13. The change-over valve 39 takes the position opposite that shown in the drawing so that the piston/cylinder arrangement 14, through the vacuum and the atmospheric pressure is held in the position as shown in the drawing.

Once a brake skid occurs during a decelerating process, the change-over valve 39 is switched over into the position shown in the drawing so that a force acting in a direction to the left in the drawing is generated on the plunger 37 of the piston/cylinder arrangement 14. At the same time, the vacuum prevailing on the blocking mechanism 18 tends to retract the piston 45 contained therein; however, this can be achieved only after the vacuum has reached a predetermined nominal value. Thereafter, the blocking plunger 40 is moved out of the blocking depression 41 of the flange 29 to thereby unlock the plunger 13.

Now, the vacuum prevailing on the driving mechanism 14 can displace the slide 35 in FIG. 2 to the left thereby pulling the plunger 13 under the cooperation of the hydraulic pressure in the cylindrical chamber out of the cylindrical chamber 12 at first slowly at a relatively high counter-holding force. With an increasing stroke of the plunger 13, the cam 33 is passed to increasingly steeper areas of the coulisse-type paths 34, 34' so that the speed of the pull-out movement of the plunger 13 is increased, whereas the available counter-retaining force under a constant force on the plunger 37, is reduced in accordance with the decrease in the hydraulic pressure in the cylindrical chamber 12. The curvature of the coulisse-type paths 34, 34' is such that the driving mechanism 14 can operate at a substantially constant actuating force.

During the pull-out movement of the plunger 13 from the cylindrical chamber 12, the restoring spring 24 of the ball valve 25 displaces the ball upwardly thereby engaging on its seat 43 to block the passage from the hydraulic conduit 23 to the cylindrical chamber 12. In this manner, no pressure is subsequently supplied by the master cylinder 21 so that the plunger 13, depending on the degree of its movement of retraction, reduces the pressure in the wheel brake cylinder in any desired manner.

Figure 3:
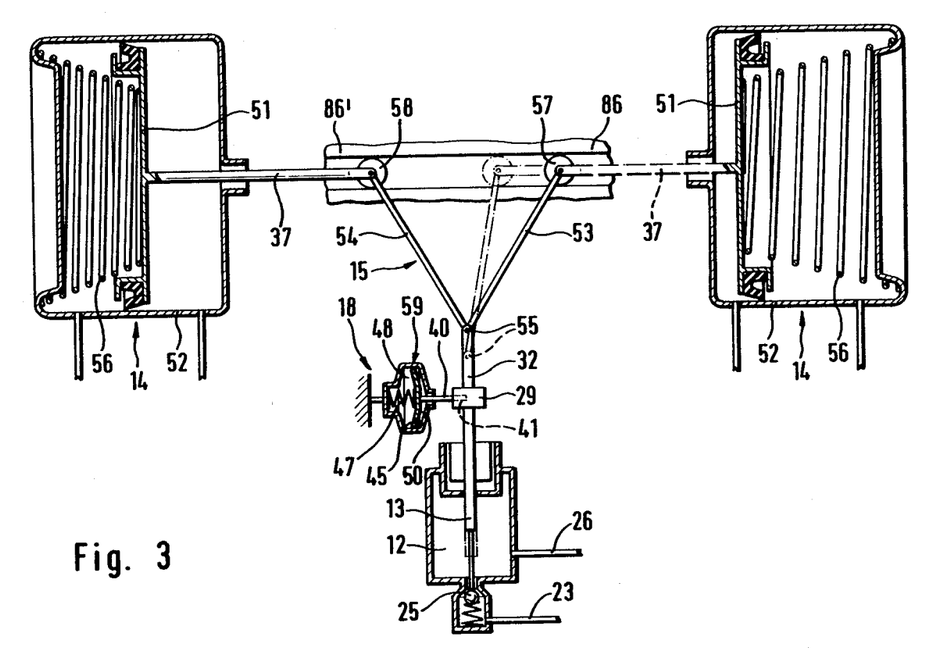
FIG. 3 schematically shows an embodiment of the brake pressure modulator operatively connected to toggle-type lever gear.

According to FIG. 3, the actuating rod 32 is connected to a toggle lever joint 55 of a toggle lever arrangement comprising toggle levers 53, 54. The free ends 57, 58 of the toggle levers 53, 54 are displaceably guided in horizontal guides 86', 86 in a horizontal direction as viewed in the drawing such that the toggle levers 54, 53 are displaceable between two end positions shown in solid and dashed lines, respectively, with the toggle lever joint 55 performing a corresponding upward and downward movement. The two free ends 57, 58, through push rods 37, are respectively in communication with a driving mechanism 14 for cooperation therewith.

The two driving mechanisms may be so driven as shown in FIGS. 1 and 2 or in a manner to be described with reference to FIG. 7.

In addition to the embodiments according to FIGS. 1 and 2, the driving pistons 51 of the driving means 14 of FIG. 3, are preloaded by a restoring spring 56 in the restoring direction of plunger 13 into their normal position.

The driving mechanism which, in FIG. 3, is the left-hand one, is in the position in which the plunger 13 is pulled out, while the other, right side, driving mechanism 14 is shown in the other extreme position in which the plunger 13 is pushed to the highest possible degree into the cylindrical chamber 12. This is the initial position.

During retraction of the driving piston 51 from the position shown in FIG. 3 to the right into the position shown to the left in FIG. 3, plunger 13 is transferred from the normal position shown in dashed lines into the retracted position shown in solid lines, with the counter-holding force exerted by the driving piston 51 against the hydraulic pressure in the cylindrical chamber 12. During the withdrawal movement, the toggle lever gear provides for the total counter-holding force to be applied by the driving means 14 substantially constantly.

The operation of the blocking arrangement 18 is similar to that of the embodiment according to FIG. 2.

Figure 4:
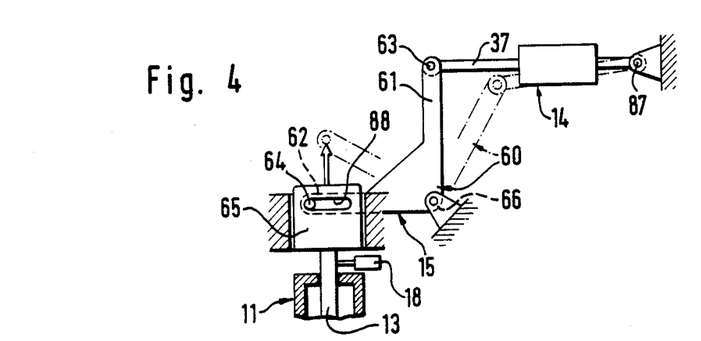
FIG. 4 schematically shows an embodiment of a brake pressure modulator operatively connected to a bell crank gear.

In the embodiment according to FIG. 4, a mechanical intermediate member for applying force to the plunger 13, is connected to a driving mechanism 14 and is shown only schematically and stationarily pivotably mounted at 87, through a bent lever 60 provided with lever arms 61, 62. The vertex 66 of the bent lever 60 is stationarily pivotable whereas the free ends 63, 63 of the lever arms 61, 62 are pivotably connected to the push rod 37 of the driving mechanism 14 and the intermediate member 65, respectively. To enable the driving mechanism 14 to follow the movements of the free ends 63, 64 during pivoting of the bent lever 60 from the position shown in solid lines into the position shown in dashed lines, it is hinged at 87 to enable the free end 64, which includes a transverse pin, to engage a transverse slit 88 in the intermediate member 65.

In the arrangement as depicted in FIG. 4, in the normal position as shown in solid lines, wherein the bent arm 61 extends substantially in parallel to the longitudinal direction of the plunger 13, relatively high counter-retaining forces can be exerted by the driving mechanism 14 on the plunger 13. In the position as shown in dashed lines, with a substantially identical force applied by driving mechanism 14, considerably lower counter-retaining forces are exerted on the plunger 13.

Figures 5, 5A, 5B, 6:
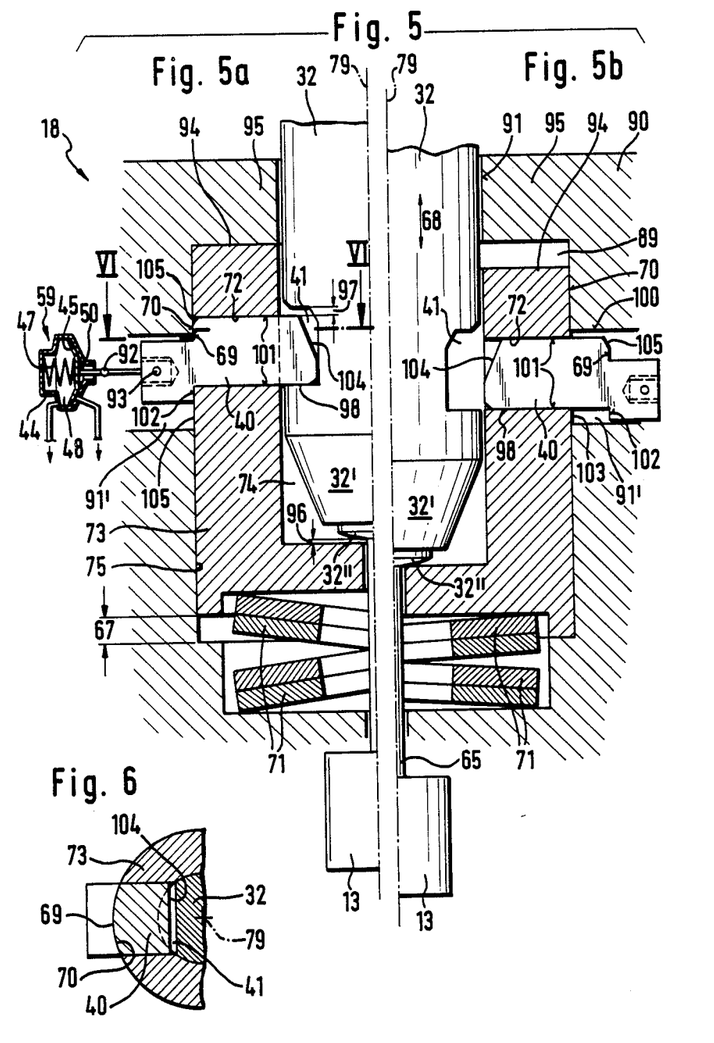
FIGS. 5a and 5b schematically show, partly in section, a blocking arrangement including dual safety means, with the locked position being shown to the left of the vertical center axis and the unlocked position being shown to the right thereof.
FIG. 6 shows a cross section taken along the live VI—VI of FIG. 5.

FIG. 5 shows a particularly preferred embodiment of the blocking arrangement 18. The actuating rod 32, in a manner conveyed by the preceding examples of embodiment, through a suitable gear 15, is again connected to the driving mechanism 14 whereas the bottom end of the actuating rod 32 is in communication with plunger 13.

According to FIG. 5, the actuating rod 32 which, in the practice of the invention, may include a bottom end 32' conically tapering downwardly and, through an intermediate member 65, which is in communication with plunger 13, engages the interior 89 of a locking block 90 through a top port 91. Provided in the chamber 89 which is of substantially larger diameter than the actuating rod 32 is a control sleeve 73 the inner chamber 74 of which is engaged by the bottom end of the actuating rod 32 with a sliding fit. The bottom end 32" of the actuating rod 32, in the blocking position shown in the left half of FIG. 5, is at a small distance 96 from the bottom of the control sleeve 73.

According to FIGS. 5 and 6, the actuating rod 32, in the area overlapping with the control sleeve 73, comprises a lateral guide channel 72 disposed in which, in radially displaceable manner, is the blocking plunger 40.

In the area of the radial outer diameter of the control sleeve 73, the blocking plunger 40 comprises a locking projection 69 in the form of an axial step cooperating in the manner as shown in the left half of FIG. 5 with an axially extending stop face 70 of the locking block 90.

Below the locking projection 69, the blocking plunger 40 projects outwardly through an entrance port 91', where it is connected in the manner as described in the preceding embodiments to the pneumatic actuating device 59 of the blocking arrangement 18, through joints 92, 93, to thereby permit a balance for the confined vertical movement of the blocking plunger 40 as described in the following.

The control sleeve 73, from the bottom, is preloaded by an interlock spring 71 having a cup spring configuration, upwardly, into the position as shown in the left half of FIG. 5, wherein the upper end 94 thereof is in abutment with an inwardly projecting flange 95 of the locking block 90.

Viewed from the blocking position as shown in the left half of FIG. 5, the control sleeve 73, in the downward direction, includes a movement range 67 relative to the block 90. The directions of movement of the actuating rod 32 are designated by 68.

The control sleeve 73, with the outer circumference thereof, in piston-type manner, is in abutment with the wall of the cylindrical recess 75 of the locking block 40.

The operation of the blocking arrangement 18 as described with reference to FIGS. 5 and 6 is as follows:

With the vacuum turned off and no deceleration performed, the actuating rod 32 is in the blocking position as shown in FIG. 5 to the left of the center line 79. The blocking push rod 40 is engaged to the blocking depression 41 while the interlock spring 71 preloads the control sleeve 73 into its upper end position such that the safety projection 69 engages behind the stop face 70 to thereby preclude withdrawal of the blocking push rod 40 even if force were applied to the pneumatic or electromagnetic actuator 59 to draw the blocking push rod 40 from its locking position. This will insure twofold safety against an undue pull-out movement of the blocking plunger 40 from its blocking position.

Once the vacuum, in the blocking position according to the illustration in the left half of FIG. 5, is turned off, the driving means shown, for example that in FIG. 2, exerts a downwardly directed force on the actuating rod 32 since at first, no brake skid has occurred. This will cause some minor downward movement of the actuating rod 32 as illustrated in FIG. 5 until the bottom end 32" of the actuating rod 32 abuts the bottom of the control sleeve 73. The standard spacing 96 of the actuating rod 32 from the bottom of the control sleeve 73, in the practice of the invention, is about half the spacing 97 of the upper edge of the blocking push rod 40 such that during the downward movement, the actuating rod 32 will directly exert its force on the bottom of the control sleeve 73 rather than through the blocking push rod 40. It is of great importance to enable the blocking push rod 40 to be subsequently radially drawn out in a manner free from any excessive frictional or clamping forces. For this purpose, it will be helpful that, through the minor relative movement between the actuating rod 32 and the blocking push rod 40, also at the lower edge 98, some minor clearance is provided between the actuating rod 32 and the blocking push rod 40.

The bottom end 32" of the actuating rod 32 will now slowly force the control sleeve 73 downwardly until the safety projection 69 gets out of engagement with the stop surface 70.

It is only now that the pneumatic actuator 49 which is now also in communication with vacuum is able to radially draw the blocking push rod 40 into the position as shown in FIG. 5 to the right of the center line 79. For that purpose, the radial recess 91' is required to have an adequate size below the blocking push rod 40 in order not to impede the downward movement of the push rod.

After the blocking push rod 40 has been drawn out, its upper edge 99 (shown to the right in FIG. 5) comes into engagement with the upper edge 100 of the recess 91' such that an automatic blocking of the control sleeve 73 in the downwardly forced position takes place.

In that position, the actuating rod 32, through the intermediate member 65, can now freely move the plunger 13 from the blocking arrangement 18, in the manner predetermined by the brake skid control circuit 84, upwardly and, subsequently, again downwardly.

In case of a failure of the vacuum, the blocking plunger 40 first moves, in the position shown in the right half of FIG. 5, into the blocking depression 41 after which only the actuating rod 32, through the interlock spring 71 along with the control sleeve 73 is displaced upwardly into the position as shown in FIG. 5, to the left of the center line 79.

What is essential is that the blocking plunger 40 includes two superposed faces 101 transferring axial forces to the control sleeve 73 and the locking block 90, respectively.

A shoulder 102 of the blocking plunger 40 provided substantially below the locking projection 69 cooperates with a counter face 103 to the effect that the radially inwardly directed movement of the blocking plunger 40 is limited.

In the upper area, the end of the blocking plunger 40 entering the blocking depression 41 is provided with an inlet ramp 104.

Another inlet ramp 105 having some minor slope is provided for the skid phase at the top end of the locking projection 69.

Figure 7:
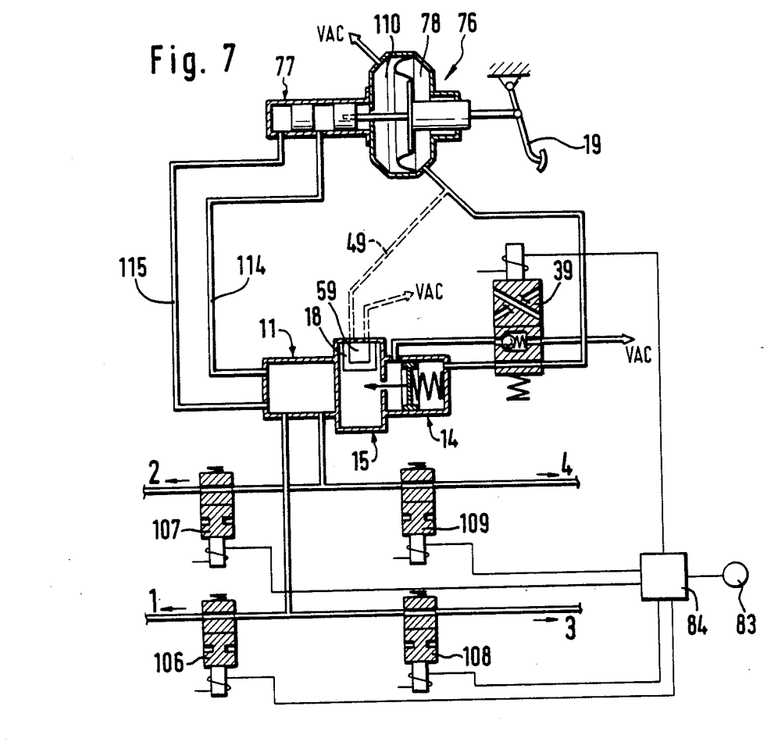
FIG. 7 schematically shows a brake system including the brake pressure modulator of the invention.

FIG. 7 shows a brake system for an automotive vehicle in which the brake pressure modulator of the invention can be used with special advantage.

The four brake circuits 1, 2, 3, 4, through closure valves 106, 107, 108 and 109, respectively, driven by the brake skid control circuit 84, are in communication with the volume take-up means 11 including two plungers (not shown) of which each is applied to one of the two wheel brake circuits 1, 3 and 2, 4, respectively, connected together. Force is applied to the two plungers in the volume take-up means 11 by the two brake circuits of a tandem master cylinder 77 through brake circuits 114, 115. The tandem master cylinder 77 is actuated by vacuum brake force booster 76 to which force is applied through the brake pedal 19.

The change-over valve 39 connects the driving means 14 of the invention, on the one hand, to the vacuum of the vacuum source 17 (VAC) and, on the other hand, to the chamber 78 of the vacuum brake force booster 76 under atmospheric pressure controlled by the brake pedal 19, whereas the other chamber 110 is in communication with vacuum (VAC).

Through conduit 49 shown in broken lines, the pneumatic actuator 59 of the blocking device 18 is in communication with the controlled device 18 is also in communication with the controlled atmospheric pressure of the brake force booster 76 while the other connection is in communication with vacuum.

Again disposed between the driving mechanism 14 and the volume take-up 11 is the gear 15 of the invention.

Generally, the afore-described measures result in a substantial reduction of external energy requirements which is especially important because the vacuum suction capability of the internal combustion engines generally employed as vacuum sources is limited. In addition, excessive volume flows are precluded that would otherwise result in a time delay of the switching processes.

What is claimed is:

1. A brake pressure modulator for a brake skid-controlled brake system for automotive vehicles, comprising at least one volume take-up means provided in a hydraulic conduit leading from a master cylinder to at least one wheel cylinder of said brake system, the volume take-up means including a plunger disposed in a cylindrical chamber, said cylindrical chamber in communication with the wheel cylinder hydraulic conduit, means for preloading the plunger into the cylindrical chamber, the plunger being closely guided out of the cylindrical chamber to the outside thereof and being connected with a vacuum-actuated driving mechanism means adapted to at leas partly retract the plunger from the cylindrical chamber upon occurrence of a brake skid signal to expand the volume of the cylindrical chamber and to thereby correspondingly decrease the brake pressure in said hydraulic conduit, variable transmission gear means provided between the driving mechanism means and the plunger, said variable transmission gear means adapted to vary its transmission ratio in response to the plunger position so that an actuating force applied by the driving mechanism means to the plunger during an entire withdrawal operation of the plunger from said cylindrical chamber remains substantially constant, wherein the driving mechanism means is a piston/cylinder arrangement in communication with an atmospheric pressure and a vacuum source, and wherein connected to the atmospheric pressure and the vacuum source is a pneumatic blocking arrangement means for blocking movement of the plunger until a predetermined vacuum is available to apply a predetermined required pressure to the driving mechanism.

2. The brake pressure modulator according to claim 1, wherein the vacuum-operated driving mechanism means, in a normal condition, forces the plunger into the cylindrical chamber and, in the event of a brake skid, a change-over valve switches to activate said driving mechanism means to retract the plunger from the cylindrical chamber, the blocking arrangement includes a pneumatic piston connected to a blocking push rod, a cylindrical housing surrounding the piston defining a blocking piston chamber, the piston is preloaded into a blocking position, the blocking piston chamber on one side of the piston is in communication with the same vacuum source as the driving mechanism, the blocking piston chamber provided on the other side of the piston is in communication, in controlled manner, with the atmospheric pressure, and the blocking push rod, with the vacuum turned off, engages a blocking depression, said depression is disposed in a section of a force transmission path including the plunger provided between the driving mechanism means and the plunger at an angle or preferably about 90° relative to the direction of the force transmission.

3. The brake pressure modulator according to claim 2, wherein the variable transmission gear comprises a cam and at least one coulisse-type path cooperating with said cam.

4. The brake pressure modulator according to claim 2, wherein the variable transmission gear comprises two toggle levers, a toggle lever joint of which is pivotably connected, through a pair of mechanical intermediate members, to the plunger, and the free ends of which are pivotably connected to respectively one of two pneumatic driving mechanism means.

5. The brake pressure modulator according to claim 2, wherein the variable transmission gear comprises a bent angle member including two lever arms disposed at an angle of, preferably, 90°, with the free ends of each said bent lever being pivotably connected to a pivotably suspended driving mechanism means and to at least one intermediate member connected to said plunger.

6. The brake pressure modulator according to claim 2, wherein the blocking push rod engages a blocking depression in an actuating rod connected to the plunger, said push rod engages the actuating rod perpendicular to the direction of movement of said plunger, movement of the blocking push rod, in the direction of movement of the actuating rod being limited, said actuating rod preloaded through an interlock spring in the direction of retraction of the plunger, said actuating rod comprises a locking projection projecting in the direction of movement, the projection cooperating with a stationary stop face such that, with the blocking push rod in the blocking position and the vacuum turned off, the interlock spring forces the blocking push rod into the locking position, with the driving mechanism means, through the actuating rod, with the vacuum switched on, displacing the blocking push rod to the other limit of its range of movement into the unlocking position.

7. The brake pressure modulator according to claim 6, wherein the blocking push rod is within a guide channel in a control sleeve extending in a direction perpendicular to the direction of movement of the actuating rod, said push rod displaceably disposed in a direction perpendicular to the said direction of movement, with the control sleeve accommodating, in the interior thereof, the actuating rod, said control sleeve being displaceable in a stationary cylindrical recess within the limited range of movement, in the said direction of movement, and the interlock spring applies force to the control sleeve in the locking direction.

8. The brake pressure modulator according to claim 2, wherein the blocking push rod, in the retracted condition thereof, is adapted to engage the control sleeve in the unlocking position thereof.

9. The brake pressure modulator according to claim 8, wherein in the event of a vacuum failure, the blocking push rod is adapted to be displaced into the blocking position by a blocking spring before the actuating rod, is displaced from the normal position under hydraulic pressure.

10. A brake pressure modulator for a brake skid-controlled brake system for automotive vehicles, comprising at least one volume take-up means provided in a hydraulic conduit leading from a master cylinder to at least one wheel cylinder of said brake system, the volume take-up means including a plunger disposed in a cylindrical chamber, said cylindrical chamber in communication with the wheel cylinder hydraulic conduit, means for preloading the plunger into the cylindrical chamber, the plunger being closely guided out of the cylindrical chamber to the outside thereof and being connected with a vacuum-actuated driving mechanism means adapted to at leas partly retract the plunger from the cylindrical chamber upon occurrence of a brake skid signal to expand the volume of the cylindrical chamber and to thereby correspondingly decrease the brake pressure in said hydraulic conduit, variable transmission gear means provided between the driving mechanism means and the plunger, said variable transmission gear means adapted to vary its transmission ratio in response to the plunger position so that an actuating force applied by the driving mechanism means to the plunger during an entire withdrawal operation of the plunger from said cylindrical chamber remains substantially constant, further comprising a vacuum brake force booster and a master cylinder to which force is applied by the brake force booster and to which are connected, through the volume take-up means, the wheel brake circuits, a pneumatic actuator of a blocking mechanism connected to said plunger is connected to a vacuum source and to the chamber of the brake force booster to which controlled air pressure is applied, respectively.

* * * * *